(12) United States Patent
Appleberry et al.

(10) Patent No.: US 12,461,161 B2
(45) Date of Patent: Nov. 4, 2025

(54) ULTRASOUND BATTERY MANAGEMENT SYSTEMS (U-BMS), AND ENERGY STORAGE SYSTEMS EMPLOYING U-BMS

(71) Applicant: Titan Advanced Energy Solutions, Inc., Salem, MA (US)

(72) Inventors: Maura C. Appleberry, Louisville, KY (US); Thomas C. Ferree, Waltham, MA (US); Paul A. Paquette, Salisbury, MA (US); Sean M. O'Day, Boca Raton, FL (US); Shawn D. Murphy, Salem, MA (US); Jeffrey A. Kowalski, Somerville, MA (US)

(73) Assignee: Titan Advanced Energy Solutions, Inc., Salem, MA (US)

( * ) Notice: Subject to any disclaimer, the term of this patent is extended or adjusted under 35 U.S.C. 154(b) by 655 days.

(21) Appl. No.: 17/839,726

(22) Filed: Jun. 14, 2022

(65) Prior Publication Data

US 2022/0397610 A1  Dec. 15, 2022

Related U.S. Application Data

(60) Provisional application No. 63/210,413, filed on Jun. 14, 2021.

(51) Int. Cl.
*G01R 31/387* (2019.01)
*H02J 7/00* (2006.01)

(52) U.S. Cl.
CPC .......... *G01R 31/387* (2019.01); *H02J 7/0019* (2013.01); *H02J 7/0048* (2020.01); *H02J 7/005* (2020.01); *H02J 7/00712* (2020.01)

(58) Field of Classification Search
CPC ....... G01N 2291/044; G01N 2291/048; G01N 2291/105; G01N 2291/2697; G01N 29/07;

(Continued)

(56) References Cited

U.S. PATENT DOCUMENTS 9,966,780 B2  5/2018  Sherstyuk et al.
9,970,993 B1  5/2018  Mensah-Brown et al.
(Continued)

FOREIGN PATENT DOCUMENTS

WO  WO 2020/087161 A1  5/2020
WO  WO 2020/260623 A1  12/2020

OTHER PUBLICATIONS

International Search Report and Written Opinion, dated Oct. 25, 2022, for International Application No. PCT/US22/33339. (13 pages).

(Continued)

*Primary Examiner* — Victoria H Lynch
(74) *Attorney, Agent, or Firm* — Rowan Tree Law Group, PLLC; Frederick F. Rosenberger

(57) ABSTRACT

An energy storage system can comprise a stack of multiple battery modules, a plurality of ultrasound emitter transducers, a plurality of ultrasound receiving transducers, one or more excitation modules, one or more capture modules, and an ultrasound battery management system. Each ultrasound emitter transducer and each ultrasound receiving transducer can be acoustically coupled to a surface of a respective one of the battery modules. The excitation module(s) can be electrically interfaced with the plurality of ultrasound emitter transducers, and the capture module(s) can be electrically interface with the plurality of ultrasound receiving transducers. The ultrasound battery management system controller can be configured to initiate battery module ultrasound interrogation sequences.

18 Claims, 5 Drawing Sheets

(58) Field of Classification Search
CPC ...... G01N 29/11; G01N 29/46; G01R 31/367;
G01R 31/387; G01R 31/392; H02J
7/00036; H02J 7/0016; H02J 7/0019;
H02J 7/0048; H02J 7/005; H02J 7/00712;
Y02E 60/10
See application file for complete search history.

(56) References Cited

U.S. PATENT DOCUMENTS

| | | |
|---|---|---|
| 10,014,561 B2 | 7/2018 | Sood et al. |
| 10,069,313 B2 | 9/2018 | Tkachenko et al. |
| 10,153,651 B2 | 12/2018 | Taylor et al. |
| 10,193,369 B2 | 1/2019 | Sherstyuk et al. |
| 10,218,200 B2 | 2/2019 | Sherstyuk et al. |
| 10,386,422 B2 | 8/2019 | Christensen et al. |
| 10,673,101 B2 | 6/2020 | Sood et al. |
| 11,050,281 B2 | 6/2021 | Sherstyuk et al. |
| 2018/0166911 A1 | 6/2018 | Ionescu et al. |
| 2019/0049518 A1 | 2/2019 | Shen et al. |
| 2019/0064123 A1 | 2/2019 | Steingart et al. |
| 2019/0207274 A1 | 7/2019 | Ladpli et al. |
| 2020/0106137 A1 | 4/2020 | Murphy et al. |
| 2020/0233038 A1 | 7/2020 | Hsieh et al. |
| 2020/0251788 A1 | 8/2020 | Sood et al. |
| 2021/0249702 A1 | 8/2021 | Murphy et al. |
| 2022/0113284 A1 | 4/2022 | Sood et al. |
| 2022/0349948 A1 | 11/2022 | Kowalski et al. |

OTHER PUBLICATIONS

EP Office Action, issued May 26, 2025 (May 26, 2025), in European Application No. 22825623. (12 pages).

ULTRASOUND BATTERY MANAGEMENT SYSTEMS (U-BMS), AND ENERGY STORAGE SYSTEMS EMPLOYING U-BMS

CROSS-REFERENCE TO RELATED APPLICATION(S)

The present application claims benefit of and priority under 35 U.S.C. § 119(e) to and is a non-provisional of U.S. Provisional Application No. 63/210,413, filed Jun. 14, 2021, entitled "Ultrasound-Battery Management Systems (U-BMS), and Energy Storage Systems Employing U-BMS," which is incorporated by reference herein in its entirety.

COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: "Copyright © <2021 2022>, Titan Advanced Energy Solutions Inc".

FIELD

The present disclosure relates generally to monitoring of one or more energy storage devices, such as one or more batteries, and more particularly, to ultrasound-based management of multiple energy storage devices.

BACKGROUND

Existing methods for managing an Energy Storage System (ESS) are based on monitoring an instantaneous voltage, current, and temperature of each battery module during charging and discharging cycles. A Battery Management System (BMS) interfaces with a Cell Interface (CI) module associated with each battery module and receives a stream of voltage, current, and temperature measurements from sensors corresponding with the CI. The ESS includes a plurality of individual battery modules, which can be connected in series or in parallel. Each battery module may include a single battery cell or a plurality of battery cells. The battery cells may be enclosed within a sealed pouch that includes battery terminals extending therefrom. One or more battery cells or pouches can be inserted into a more rigid battery module container or housing, which may be filled with a liquid electrolyte and sealed. The battery cells can be interconnected in series, in parallel, or in a combination of series and parallel connections. The sealed container (e.g., a battery module) can include battery terminals extending therefrom. The ESS configuration is selected to provide an ESS that meets desired requirements for energy storage capacity, energy output characteristics, operating voltage, and current range. A plurality of battery modules connected in series is known as a battery stack. The ESS configuration can include one or more battery stacks interconnected in series, in parallel, or both.

Battery module charge balancing is used to uniformly charge and discharge all the battery modules of an ESS. It is desirable that each battery module of an ESS always have the same State of Charge (SoC). Additionally, it is desirable that no battery modules are over-charged or over-discharged during charging and discharging cycles, since either condition can damage a battery module and/or lead to battery failure, thermal runaway, or other hazardous battery states. Numerous factors prevent or complicate charge balancing when charging or discharging a plurality of battery modules. In a conventional stack of battery modules, where each battery module includes a plurality of battery cells, all the battery modules are connected in series and therefore theoretically have the same current flowing through them. However, a problem with conventional battery stacks is that not all the battery modules store the same amount of energy. One reason for this is that battery module internal resistance differs from one battery module to another. The difference in internal resistance is in part due to differences in battery components, e.g., chemical differences, material layer thicknesses variations, and mechanical defects, which potentially contributes to differences in battery internal resistance. As a result, each battery module of a stack receives slightly different amounts of useful charge, causing the SoC of individual stack batteries to become uneven or "unbalanced." To ensure battery modules connected in a stack operate cohesively and remain within desired voltage limits, the battery modules are charge balanced by attempting to equalize measured battery voltage across all the battery modules.

However, measured voltage alone is not a reliable indicator of actual SoC because battery voltage versus SoC curves are non-linear and the voltage range between a fully-discharged and a fully-charged battery module is small. For example, the open-circuit voltage (OCV) of a lithium-ion (Li-ion) battery module is directly related to SoC, but not directly to charge energy delivered into the battery module. The overall voltage range versus SoC of an exemplary Li-ion battery module is as follows. At zero SoC (e.g., fully discharged), the OCV is about 5.0 V. At 100% SoC (e.g., fully charged), the OCV is about 8.5 V, with a total voltage range of 3.5V. Thus, even if the voltage versus SoC curve were linear, a 1% change in SoC would relate to a voltage change of 0.04V, which may not be reliably measurable. Moreover both the battery voltage and the SoC vary with changes in battery temperature. For the same exemplary Li-ion battery module, the non-linear aspects of voltage versus SoC curves can be divided into three zones: 0-20% SoC, 20-80% SoC, and 80-100% SoC. The SoC range of 0-20% corresponds with the largest change in OCV. Over the SoC range 0-20%, the battery voltage range is about 5.0V to 7.5V, or about 71.5% of the total voltage range. Over the SoC range 20-80%, the OCV range is about 7.5V to 7.8V or about 8.5% of the total voltage range. Over the SoC range 80-100%, the OCV range of 7.8V to 8.5V is about 20% of the total voltage range. In view of the non-linearity of the voltage versus SoC curves for many battery types, change balancing is only applied when battery modules are nearly fully charged (e.g., when the battery voltage reaches about 7.8V or about 80% charged). However, only using charge balancing for the final 20% of the SoC range does not provide enough charge balancing cycles to achieve full charge balancing. As a result, some battery modules may not reach 100% SoC levels and/or the charge capacity of some battery modules may remain unchanged.

A conventional ESS can include a stack switchgear (SG) module and a CI module coupled to a conventional BMS. The SG module is disposed between a power exchange module (e.g., power source or power load interface) and an ESS stack. The SG, the CI, and the BMS are operated to manage stack charging and discharging cycles and stack charge balancing. The charge balancing includes a module configured to selectively disproportionally charge or discharge one or more battery modules during charging and discharging cycles to match all battery module measured voltage values with an average battery module voltage of the battery stack. The SG module limits current amplitude by applying resistors positioned to divert energy from targeted battery modules to reduce or increase the battery voltage as compared to the average battery module voltage of the battery stack. In practice, the conventional BMS and SG module only balances when battery module voltages reach about 80 to 85% charged.

The conventional BMS can monitor functional energy storage device parameters e.g., current, voltage, temperature by the CI, and can calculate or infer performance metrics, e.g., SoC, state of health (SoH) and energy storage capacity, based on battery voltage alone. The conventional BMS can track and communicate the condition of each battery module to an external system, e.g., the power exchange module. The conventional BMS can attempt to protect the battery from harmful conditions, e.g., over-charging, over-discharging, excess temperature, excess voltage, or current conditions. To ensure a battery operates within safe electrochemical limits, a conventional BMS imposes voltage limits serving as bounds for battery operation. The conventional BMS uses voltage and current measurements for each battery module to compute battery capacity metrics (e.g., SoC, SoH) to understand available energy capacity within voltage bounds, since SoC and SoH cannot be measured directly. However, this practice results in some battery modules never reaching 100% SoC levels and can leave available ESS stack charge storage capacity underutilized.

Embodiments of the disclosed subject matter may address one or more of the above-noted problems and disadvantages, among other things.

SUMMARY

Embodiments of the disclosed subject matter system provide systems, devices, and methods for managing an energy storage system (ESS) comprising multiple energy storage stacks (e.g., battery stacks) by using ultrasound measurements of the stacks and/or individual units (e.g., batteries) therein. An ESS system can include a battery stack. Each battery module of the battery stack can be acoustically coupled to an ultrasound emitter (e.g., transducer) and/or an ultrasound receiver (e.g., transducer). In some embodiments, an ultrasound BMS module can be operable to manage the battery stack and to capture periodic ultrasound interrogation data corresponding with of each battery of the battery stack. A processing module can determine a state of charge (SoC) value and/or state of health (SoH) value for one, some, or all units of the stack. In some embodiments, a battery charge balancing module coupled to the stack can operate to selectively limit current flow to and/or from a selected unit of the stack based at least in part on the determined SoC and/or SoH values.

Embodiments of the disclosed subject matter can provide a closed-loop solution for making physics-based charge capacity measurements, for example, by determining SoC and/or SoH based at least in part on periodic ultrasound signatures of each module (e.g., battery module) of an ESS stack (e.g., a battery stack). In some embodiments, the ultrasound signatures can be generated by coupling one or more ultrasound transducers (e.g., transceiver) to each battery module of a stack, and electrically coupling each ultrasound transducer to an ultrasound-based battery management system (U-BMS). The ultrasound transducers can include an ultrasound emitter acoustically coupled to a surface of a battery module and that emits ultrasound energy into the corresponding battery module. Alternatively or additionally, the ultrasound transducers can include an ultrasound receiver acoustically coupled to a surface of a same battery module. The ultrasound receiver can receive ultrasound energy that has passed through the battery module and can generate an electrical signal representative of the received ultrasound energy.

In some embodiments, the physics-based capacity measurements of SoC and SoH are derived by one or more SoC/SoH modules associated with the U-BMS. The SoC/SoH modules can determine SoC and/or SoH values by characterizing the ultrasound signatures. In some embodiments, the one or more SoC/SoH modules can be configured to determine SoC and/or SoH values independently of instantaneous battery voltage. In some embodiments, the ultrasound signatures may be generated during battery charging or discharging cycles. Such physics-based capacity measurements can improve the resolution and accuracy of SoH and/or SoC values as compared to deriving SoC and SoH from voltage measurements. By using the ultrasound-derived measurements described herein, embodiments of the disclosed subject matter are capable of charge-balancing a stack of battery modules over a larger battery voltage range than has otherwise been possible with conventional techniques. By increasing the battery voltage range over which charge-balancing of battery modules can occur, the total charge capacity of the battery stack can be increased.

In a representative embodiment, an energy storage system can comprise a stack of multiple battery modules, a plurality of ultrasound emitter transducers, a plurality of ultrasound receiving transducers, one or more excitation modules, one or more capture modules, and an ultrasound battery management system controller. Each ultrasound emitter transducer can be acoustically coupled to a surface of a respective one of the battery modules. Each ultrasound receiving transducer can be acoustically coupled to a surface of a respective one of the battery modules. The one or more excitation modules can be electrically interfaced with the plurality of ultrasound emitter transducers. The one or more capture modules can be electrically interface with the plurality of ultrasound receiving transducers. The ultrasound battery management system controller can be configured to initiate battery module ultrasound interrogation sequences.

In another representative embodiment, a method can comprise acoustically coupling ultrasound emitter transducers and ultrasound receiving transducers to battery modules of a stack of multiple battery modules. The method can further comprise electrically interfacing each ultrasound emitter transducer with one or more excitation modules, and electrically interfacing each ultrasound receiving transducer with one or more capture modules. The method can also comprise initiating battery ultrasound interrogation sequences by an ultrasound battery management system controller.

In another representative embodiment, a method is provided for operating an energy storage system (ESS) to charge balance a stack of battery modules. The method can comprise configuring the stack for ultrasound interrogation of each battery module and capturing ultrasound signal data corresponding with ultrasound energy passing through each battery module. The method can also comprise processing the ultrasound signal data by an SoC/SoH module and assigning a state of charge value to each battery module and generating charge balancing commands based on the state of charge value associated with each battery module. The method can further comprise charge balancing the stack over an assigned state of charge value range of 15% to 100% during stack charging cycles, and/or charge balancing the stack over an assigned state of charge value range of 100% to 15% during stack discharging cycles.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

DETAILED DESCRIPTION

General Considerations

Figure 1:
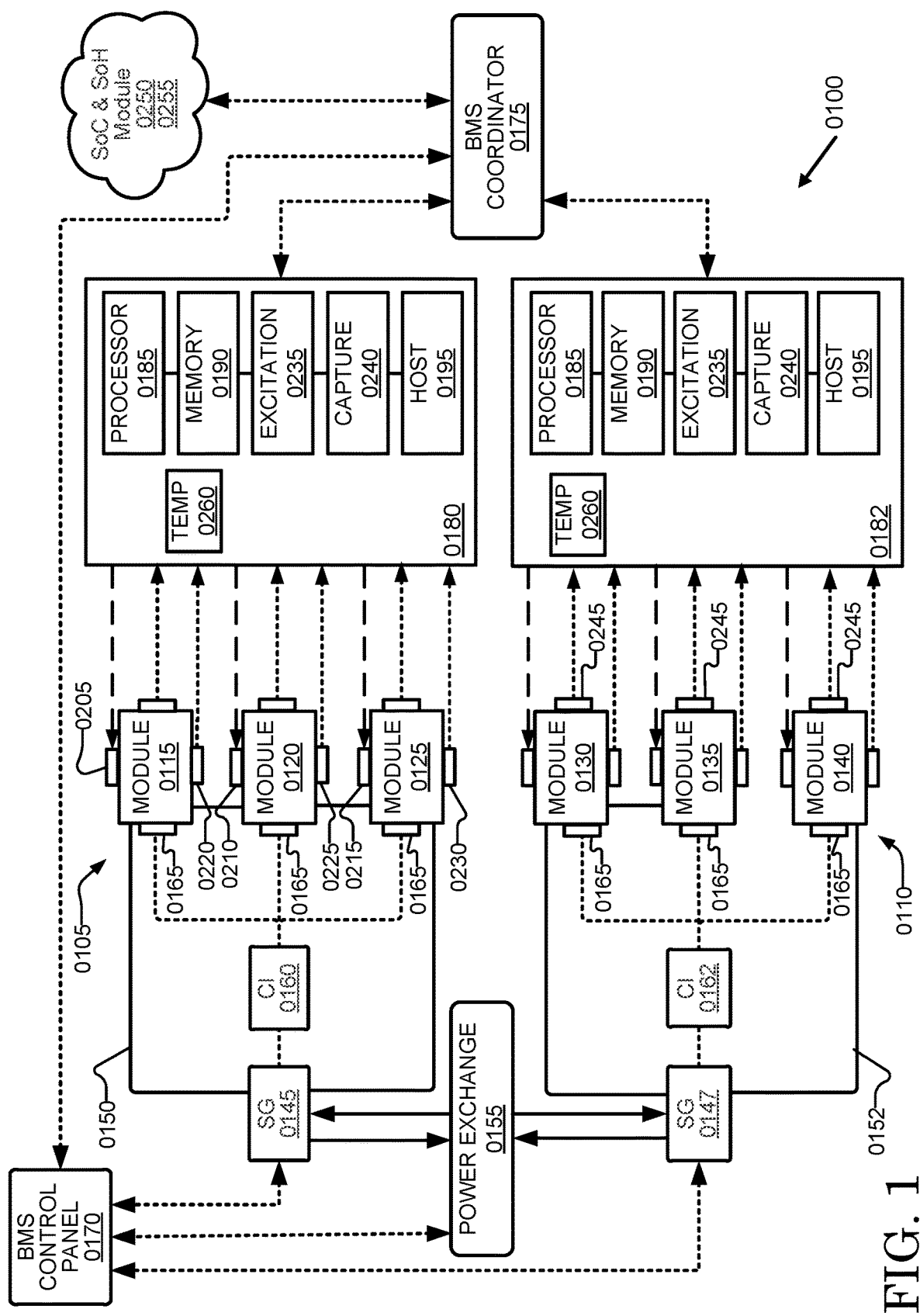
FIG. 1 is schematic representation of an Energy Storage System (ESS) that includes and an Ultrasound Battery Management System (U-BMS) according to one or more embodiments of the disclosed subject matter.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and subcombinations with one another. The methods and systems are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one skilled in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person skilled in the art to have a more definitive construction, the numerical parameters set forth are approximations that may depend on the desired properties sought and/or limits of detection under standard test conditions/methods, as known to those skilled in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein but are not intended to be limiting. For example, certain terms may be used such as "inner," "outer,", "upper," "lower," "top," "bottom," "interior," "exterior," "left," right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part, and the object remains the same.

As used herein, "comprising" means "including," and the singular forms "a" or "an" or "the" include plural references unless the context clearly dictates otherwise. The term "or" refers to a single element of stated alternative elements or a combination of two or more elements unless the context clearly indicates otherwise. As used herein, the term "and/or" includes any and all combinations of one or more of the associated listed items. It will be further understood that the terms "includes," "comprises," "has," "including," "having," and/or "comprising," when used in this specification, specify the presence of stated features, integers, steps, operations, elements, and/or components, but do not preclude the presence of addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present, unless explicitly stated otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Unless explained otherwise, all technical and scientific terms used herein have the same meaning as commonly understood to one skilled in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Features of the presently disclosed subject matter will be apparent from the following detailed description and the appended claims.

Overview of Terms

The following is provided to facilitate the description of various aspects of the disclosed subject matter and to guide those skilled in the art in the practice of the disclosed subject matter.

The reference numbers below are used throughout this description and the accompanying drawings, unless specifically indicated otherwise:

| Ref. No. | Description | Ref. No. | Description |
|---|---|---|---|
| 0100 | Ultrasound-enabled Energy Storage System (U-ESS) | 0245 | Temperature sensor |
| 0105 | Battery stack | 0250 | State of Charge (SOC)/ State of Health (SOH) module |
| 0110 | Battery Stack | 0255 | Machine learning module |
| 0115 | Battery module | 0260 | Temperature module |
| 0120 | Battery module | 0300 | Method, generally |
| 0125 | Battery module | 0305 | Process block |
| 0130 | Battery module | 0310 | Process block |
| 0135 | Battery module | 0315 | Process block |
| 0140 | Battery module | 0320 | Process block |
| 0145 | Switching gear (SG) module | 0325 | Process block |
| 0147 | SG module | 0330 | Process block |
| 0150 | Power circuit | 0335 | Process block |
| 0152 | Power circuit | 0340 | Process block |
| 0155 | Power exchange module | 0345 | Method, generally |
| 0160 | Cell interface (CI) module | 0350 | Process block |
| 0162 | CI module | 0355 | Process block |
| 0165 | Sensor module | 0360 | Process block |
| 0170 | Ultrasound Battery Management System (U-BMS) control panel | 0365 | Process block |
| 0175 | U-BMS Coordinator Module | 0375 | Process block |
| 0180 | U-BMS Controller | 0380 | Process block |
| 0182 | U-BMS Controller | 0385 | Process block |
| 0185 | U-BMS Processor | 920 | Computing environment |
| 0190 | Memory | 925 | Software |
| 0195 | Host module | 930 | Central processing unit |
| 0205 | Ultrasound transducer | 935 | Graphic or co-processing unit |
| 0210 | Ultrasound transducer | 940 | Memory |
| 0215 | Ultrasound transducer | 945 | Memory |
| 0220 | Ultrasound transducer | 950 | Configuration |
| 0225 | Ultrasound transducer | 960 | Data store |
| 0230 | Ultrasound transducer | 970 | Input device(s) |
| 0235 | Excitation module | 980 | Output device(s) |

-continued

| Ref. No. | Description | Ref. No. | Description |
|---|---|---|---|
| 0240 | Capture module | 990 | Communication connection(s) |

Introduction

As shown in FIG. 1, an Ultrasound Battery Management System (U-BMS) architecture can include a U-BMS control panel 0170, a U-BMS coordinator 0175, and one or more U-BMS controllers 018, 0182 coupled to energy storage systems (e.g., batteries) to form an ultrasound-enabled Energy Storage System (U-ESS) 0100. In the illustrated example, the U-ESS 0100 includes two battery stacks 0105, 0110; however, any number of battery stacks can be provided according to one or more contemplated embodiments. In the illustrated example, battery stack 0105 includes three battery modules 0115, 0120, 0125, and battery stack 0110 includes three battery modules 0130, 0135, 0140. However, any number of battery modules can be included in each battery stack according to one or more contemplated embodiments. In some embodiments, each battery module 0115-0140 can include at least one lithium-ion battery cell. In some embodiments, each battery module 0115-0140 can include four pouch cells housed inside a rectangular metal casing. For example, in some embodiments, each battery module can be a Nissan Leaf lithium-ion battery module comprising four pouch cells connected in a 2s-2p arrangement. In some embodiments, the metal casing can include opposing and parallel top and bottom walls, opposing and parallel side walls, and opposing and parallel end walls, all joined together to form a gas tight battery module enclosure.

In some embodiments, each battery module 0114-0140 can include a positive and a negative electrical terminal, each of which can be configured to connect the corresponding battery module to a respective power circuit 0150, 0152. In some embodiments, each power circuit 0150, 0152 can be electrically coupled with a power exchange module 0155 through a respective switching gear (SG) module 0145, 0147. For example, the power exchange module 0155 can comprise a DC power bus that can be interfaced with other power devices, e.g. a power load, a power source, other energy storage devices, an electrical power grid interface, a photovoltaic-based energy generating system, a turbine-based energy generating system, a fuel cell energy storage system, other external power distribution appliances, other power conditional devices, or any combination of the foregoing.

In the illustrated example, the power circuit 0150 of the first battery stack 0105 electrically interconnects first SG module 0145 in series with the plurality of battery modules 0115-0125 of the first stack 0105. The SG module 0145 also electrically couples the first battery stack 0105 with the power exchange module 0155. A first cell interface (CI) module 0160 can provide a sensor interface 0165 with each of the plurality of battery modules 0115-0125. In some embodiments, the CI module 0160 can include one or more voltage sensors, one or more current sensors, and/or one or more temperature sensors coupled to battery modules 0115-0125 to measure instantaneous battery voltage, current, and/or temperature thereof. In some embodiments, the voltage sensor(s) and/or current sensor(s) can be coupled with battery terminals. For example, the CI module 0160 may include coulomb counting elements operating to track lifetime charging and discharging cycle information corresponding with each battery module. Each of the SG module 0145 and the CI module 0160 can be connected (e.g., via wired or wireless connections), either directly or indirectly, to one or more control modules, for example, the BMS control panel 0170, the BMS coordinator module 0175, and/or U-BMS controllers 0180, 0182. The power circuit 0152 of the second battery stack 0110, the second SG module 0147, and/or the second CI module 0160 can be configured with respect to battery modules 0130-0140 in a similar manner.

In the illustrated example, the BMS control panel 0170 can control each of SG modules 0145, 0147, can communicate with the power exchange module 0155, and/or can receive sensor data from the CI modules 0160, 0162. In some embodiments, the BMS control panel 0170 can also manage charge balancing based on charge balancing commands. In some embodiments, the BMS coordinator 0175 can operate as an interface communication module to exchange data and commands between U-BMS modules, BMS modules, and/or other modules or components of the U-ESS 0100. For example, in FIG. 1, the U-BMS modules interfaced with the BMS coordinator 0175 include the U-BMS controller hosts 0195 and the SoC/SoH module 0250, and the BMS modules interfaced (e.g., through the BMS control panel 0170) with the BMS coordinator 0175 include SG modules 0145, 0147, CI modules 0160, 0162, and the power exchange module 0155.

In some embodiments, the BMS control panel 0170 and the BMS coordinator 0175 can each include a processor, a memory module, a communication interface, and energy management schema elements operating on corresponding processors. For example, in some embodiments, one, some, or all of the SG modules can comprise a switchgear module configured to manage charge balancing, for example, Stack Switchgear sold by Nuvation Energy, Sunnyvale, California. In some embodiments, the BMS control panel 0170, the CI modules 0160, 0162, or both can be configured to manage a conventional charge balancing process. In some embodiments, in operating modes, the BMS control panel 0170 can receive sensor data from each CI module 0160, 0162 and can forward the sensor data to the U-BMS coordinator 0175, for example, to be stored in a memory module 0190 of the respective U-BMS controller 0180, 0182. Alternatively or additionally, in some embodiments, the BMS control panel 0170 can receive power exchange information (e.g., charging or discharging, stack power input or output, etc.) from the power exchange module 0155 and can forward the power exchange information to the U-BMS coordinator 0175. In some embodiments, the U-BMS coordinator 0175 can also receive SoC and SoH values from the SoC/SoH module 0250 and can forward the information to the corresponding stack U-BMS controller 0180, 0182. In some embodiments, the U-BMS coordinator 0175 can also receive charge balancing commands from the stack U-BMS controller 0180, 0182 and can forward the charge balancing commands to the BMS control panel 0170 for delivery to the SG modules 0145, 0147.

In the illustrated example of FIG. 1, the second battery stack 0110 is configured in a manner similar to that described above for the first battery stack 0105; however, in some embodiments, the second battery stack (or third or more battery stacks) can have a configuration different from the first battery stack (or other battery stacks in the U-ESS). In the illustrated example of FIG. 1, the second battery stack 0110 includes three battery modules 0130, 0135, 0140, a second SG module 0147 coupled in parallel to the power exchange module 0155, a second CI module 0162 interfaced with each battery of the second stack, and a second U-BMS controller 0182 corresponding with the second stack 0110. The second stack 0110 can interface with the control modules in a similar manner as described above so as to receive sensor data from a second CI module 0162 and forward the sensor data to a second U-BMS controller 0182 corresponding with the second battery stack. In some embodiments, the BMS control panel 0170 can be interfaced with a U-BMS coordinator 0175, which exchanges command and control messages related to power distribution associated with the second stack 0110 via the second SG module 0147 and the power exchange module 0155.

In the illustrated example of FIG. 1, the BMS coordinator 0175 interfaces with each of the U-BMS controllers 0180, 0182 corresponding with the first and the second battery stacks 0105, 0110. In some embodiments, power distribution and battery balancing corresponding with each battery stack can be separately managed by the two U-BMS controllers 0180, 0182. For example, each U-BMS controller 0180, 0182 can comprise a controller processor 0185 in communication with each of a memory 0190, an excitation module 0235, a capture module 0240, and/or a host module 0195. In some embodiments, each host module 0195 can be interfaced with the BMS coordinator 0175. In the illustrated example, each host module 0195 is coupled with the U-BMS coordinator 0175, with the power exchange module 0155, and the CI modules 0160, 0162 via the SG modules 0145, 0147, so as to manage power distribution and battery balancing by each battery stack.

Ultrasound Signal Generation and Processing Architecture

Referring again to FIG. 1, each battery module 0115, 0120, 0125 of the first battery stack 0105 includes a respective first ultrasound transducer 0205, 0210, 0215 acoustically coupled to a surface (e.g., a top surface) of the corresponding battery module. A second ultrasound transducer 0220, 0225, 0230 can be acoustically coupled to an opposing bottom surface of the corresponding battery module 0115, 0120, 0125. In some embodiments, each first ultrasound transducer 0205-0215 can be an ultrasound emitting transducer electrically interfaced with the excitation module 0235 of U-BMS controller 0180, and each second ultrasound transducer 0220-0230 can be a receiving transducer electrically interfaced with the capture module 0240 of U-BMS controller 0180. In some embodiments, the ultrasound emitting transducer electrically interfaced with the excitation module 0235 and the ultrasound receiving transducer electrically interfaced with the capture module 0240 can be disposed on opposite top and bottom battery module surfaces (e.g., aligned with or offset from each other) or on the same battery module surface.

In some embodiments, one, some, or all of the transducers 0205-0230 can be operated as an ultrasound emitting transducer or as ultrasound receiving transducer, for example, depending on whether the transducer is electrically interfaced with the excitation module 0235 or with the capture module 0240 of the respective U-BMS controller. When the ultrasound emitting transducers and the ultrasound receiving transducers are disposed in an opposing configuration, the ultrasound energy can be delivered into the battery module in through-transmission mode. During through-transmission mode, ultrasound energy emitted by the ultrasound emitting transducer passes from a first surface of a battery module to an opposing second surface of a battery module, where a portion of the ultrasound energy passes through the opposing second surface to excite the ultrasound receiving transducer. Alternatively, in some embodiments, a pair of ultrasound transducers can both be coupled to a same surface of a battery module. In this configuration, a first of the transducer pair can be operated as an ultrasound emitting transducer when it is electrically interfaced with the excitation module 0235, and a second of the transducer pair can be operated as an ultrasound receiving transducer when it is electrically interfaced with the capture module 0240. When the ultrasound emitting transducers and the ultrasound receiving transducers are both acoustically coupled to the same surface of the battery module, the ultrasound energy can be delivered in echo-transmission mode. During echo-transmission mode, ultrasound energy emitted by the ultrasound emitting transducer passes from a first surface of the corresponding battery module to an opposing second surface of the corresponding battery module where a portion of the ultrasound energy passes through the opposing second surface and a portion of the ultrasound energy is reflected from the opposing second surface. The ultrasound energy reflected from the opposing second surface passes from the opposing second surface back to the first surface where a portion of the ultrasound energy passes through the first surface to excite the ultrasound receiving transducer. Thus, through-transmission mode corresponds with the ultrasound energy making one pass through the battery module and echo-transmission mode corresponds with the ultrasound energy making two passes through the battery module.

In some embodiments, the U-BMS controller 0180 can be configured to control and/or manage the ultrasound emitting transducers 0205, 0210, 0215. For example, to emit ultrasound energy, the U-BMS controller processor 0185 can command the excitation module 0235 to deliver an electrical excitation signal to one, some, or all of the connected ultrasound emitting transducers. In some embodiments, the electrical excitation signal generated by the excitation module 0235 can be a square wave having a constant positive voltage for a time duration. Alternatively or additionally, in some embodiments, the electrical excitation signal generated by the excitation module 0235 can be a square wave having a constant positive voltage for a first time duration followed by a constant negative voltage for a second time duration (where the second time duration may be the same as or different from the first time duration).

In some embodiments, the electrical excitation signal generated by the excitation module 0235 can have a large ultrasound frequency range with a center of the ultrasound frequency range corresponding with a natural resonant frequency of the ultrasound emitting transducers coupled to the excitation module 0235. For example, the electrical excitation signal can have a center frequency in a range of 100 kHz to 1.10 MHz, inclusive, and a pulse duration in a range of 600 to 800 nanoseconds (ns), inclusive. The electrical excitation signal center frequency range, pulse duration, and/or pulse form may depend on characteristics of the emitting transducers and/or may vary depending on battery module size, battery module type, and/or battery module geometry.

In some embodiments, during battery interrogation sequences, the electrical excitation signal generated by the excitation module 0235 may comprise a single electrical signal instance or a plurality of sequential identical electrical signal instances separated in time. For example, a single electrical drive signal can be sequentially emitted 32 to 64 times. In some embodiments, the time separation between identical electrical signal instances can exceed the time it takes for ultrasound energy corresponding with a prior electrical signal instance to dissipate. In some embodiments, in response to a single electrical excitation signal, a single ultrasound emitting transducer can emit ultrasound energy into and through a corresponding battery module. While passing through the battery module, the ultrasound energy can be modified (e.g., attenuated) as ultrasound energy is absorbed, reflected, and/or scattered by internal and exterior structures of the battery module. For example, the ultrasound energy can include harmonics of the center frequency and echoes of the ultrasound energy that is reflected one or more times through the battery module.

Upon exiting from the battery module, the ultrasound energy can excite a corresponding ultrasound receiving transducer mounted to the battery wall (e.g., opposing the battery wall to which the ultrasound emitting transducer). In response to the excitation, the ultrasound receiving transducer can generate an electrical response signal, which is received by the capture module 0240. Upon receiving the electrical response signal, the capture module 0240 modifies the electrical response signal (e.g., by amplifying, filtering, digitizing, cleaning, and/or otherwise modifying the electrical response signal) in preparation for analysis. In some embodiments, when a sequential series of electrical excitation signals is delivered to an ultrasound emitting transducer, the corresponding ultrasound receiving transducer can be excited by a plurality of instances of ultrasound energy exiting from the battery module and can generate a series of electrical response signals corresponding with the sequential series of electrical excitation signals. Upon receiving each electrical response signal, the capture module 0240 modifies the electrical response signal (e.g., by amplifying, filtering, digitizing, cleaning, and/or otherwise modifying the electrical response signal) in preparation for analysis.

In some embodiments, the capture module can associate each electrical response signal with a signal ID, a signal time stamp, a sequence number, etc. Alternatively or additionally, the capture module can associate each electrical response signal with data that is not ultrasound related, for example, measured battery temperature, measured battery voltage, measured battery current, a battery ID, a battery type, etc. In some embodiments, when the battery module is evaluated based on a plurality of electrical drive signals (e.g., when a group of 32 or 64 individual electrical response signals is received by the capture module 0240), the sequence of electrical response signals may be treated as a single data set. Upon receiving the plurality of electrical response signals, the capture module 0240 can optionally modify each individual electrical response signal (e.g., by amplifying, filtering, digitizing, cleaning, and/or otherwise modifying the individual electrical response signals). In some embodiments, characteristics of the individual electrical response signals can then be combined (e.g., by averaging, generating root mean square (RMS) values, calculating a quadratic mean, etc., corresponding with the group of 32 or 64 individual electrical response signals). In some embodiments, each capture data instance can be sent to the SoC/SoH module 0250, which can analyze the capture data instance and associate an SoC value and/or an SoH value with the capture data instance.

In some embodiments, each battery stack (e.g., stack 0105) can have associated therewith a plurality of ultrasound emitting transducers (e.g., three transducers 0205, 0210, 0215 corresponding to the three battery modules 0115, 0120, and 0125), a plurality of ultrasound receiving transducers (e.g., three transducers 0220, 0225, 0230 corresponding to the three battery modules 0115, 0120, and 0125), and a plurality of temperature sensing transducers (e.g., three sensors 0245, such as a thermocouple or other thermal measurement device, corresponding to the three battery modules 0115, 0120, and 0125). In some embodiments, one, some, or all of the ultrasound emitting transducers can be electrically interfaced with the excitation module 0235 of the respective U-BMS controller, and one, some, or all of the ultrasound receiving transducers can be electrically interfaced with the capture module 0240 of the respective U-BMS controller. In some embodiments, one, some, or all of the temperature sensors 0245 can be in communication with the temperature module 0260 of the respective U-BMS controller. In some embodiments, the excitation module 0235, the capture module 0240, and/or the temperature module 0260 can be in communication with the stack processor 0185, and the stack processor 0185 can be in communication with the stack host 0195. In some embodiments, the stack host 0195 can be interfaced with the SoC/SoH module 0250, the BMS coordinator 0175, the BMS control panel 0170, the power exchange module 0155, the SG module 0145, and/or the CI module 0160.

In some embodiments, SoC/SoH module 0250 can include a server processor, a server memory, and/or a server network interface device in communication with the server processor. For example, the SoC/SoH module can be configured to analyze the capture data in a time domain, an amplitude domain, an energy domain, and/or a frequency domain using trained machine learning models and/or other analytical processes. In some embodiments, capture data processing may include converting capture data instances to a root mean square (RMS) plot, a Hilbert Transform plot, a Fourier Transform plot, etc., which plots can subsequently be analyzed and characterized. In some embodiments, when all the various analytical and data manipulations are considered, the SoC/SoH module 0250 can derive an SoC value and/or an SoH value corresponding with the capture data.

In some embodiments, the SoC/SoH module can include one or more machine learning models 0255 operated by the server processor. The machine learning modules can be configured to recognize and analyze features and/or feature extractions of the capture data based on training data. In some embodiments, the features or feature extractions may include temporal data, e.g., time of flight, time of peak amplitude, time of harmonics, time of unexpected features, time of a primary energy peak, time of a secondary energy peak, time of maximum frequency, etc. Alternatively or additionally, in some embodiments, the features or feature extractions may include frequency data, e.g., frequency range, center frequency, harmonic frequencies, unexpected frequency variations, etc. Alternatively or additionally, in some embodiments, the features or feature extractions may include peak amplitude energy, harmonic energy peaks, unexpected energy peaks, etc. Other features or feature extractions are also possible according to one or more contemplated embodiments.

After evaluating a capture data instance, the SoC/SoH module 0250 can assign an SoC value and/or SoH value to the capture data instance. The SoC and/or SoH values, which correspond with a single stack battery module, can then be transmitted by the SoC/SoH module 0250 back to the corresponding battery stack capture module 0240, for example, for storage in the corresponding memory module 0190 of the U-BMS controller 0180, 0182.

Battery Management Methods

Figure 2:
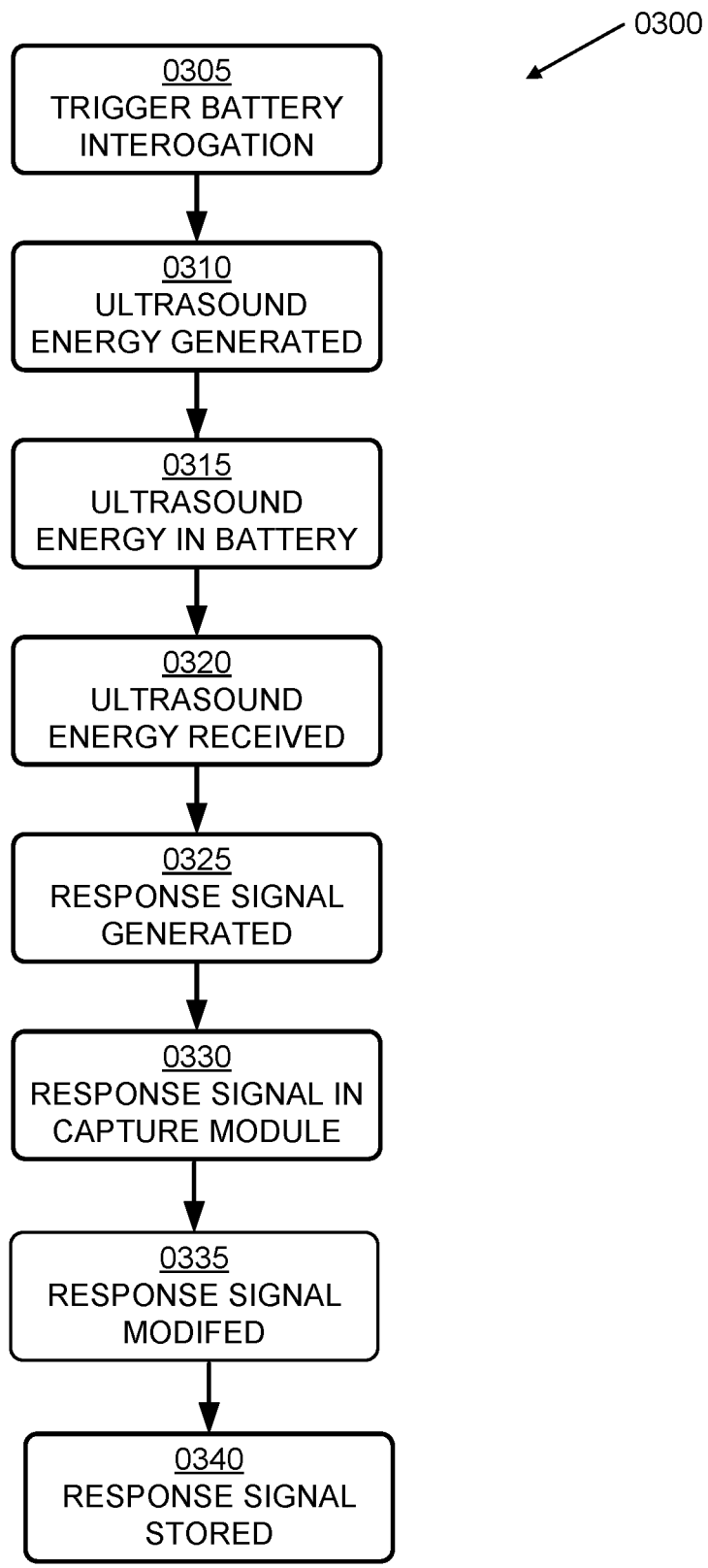
FIG. 2 is a graphical depiction of exemplary functionality for a U-BMS, according to one or more embodiments of the disclosed subject matter.

FIG. 2 illustrates a method 0300 for ultrasound interrogation of battery modules of an ESS. In some embodiments, the method 0300 can be implemented via ultrasound interrogation of battery modules of an ESS, for example, the ESS configuration of FIG. 1. The method 0300 can initiate at process block 0305, where an interrogation of one or more battery modules is triggered. For example, in some embodiments, the stack processor of a U-BMS controller can trigger a battery module ultrasound interrogation process by commanding the excitation module to generate an electrical excitation signal. The method 0300 can proceed to process block 0310, where ultrasound energy can be generated. For example, in some embodiments, an electrical excitation signal can be generated (e.g., by excitation module 0235) and transmitted to one or more of the ultrasound emitter transducers (e.g., transducers 0205-0215). The electrical excitation signal can excite the ultrasound emitting transducer, which in turn delivers ultrasound energy into the respective battery module.

The method 0300 can proceed to process block 0315, where ultrasound energy passes through the respective battery module (e.g., through an interior of a respective battery module 0115-0125). The method 0300 can proceed to process block 0320, where the ultrasound energy can be received. For example, in some embodiments, the ultrasound energy can exit each battery module and can excite the corresponding ultrasound receiving transducer (e.g., transducers 0220-0230). The method 0300 can proceed to process block 0325, where a response signal is generated. For example, in some embodiments, one, some, or all of the ultrasound receiving transducers can generate an electrical response signal corresponding to the received ultrasound energy. The method 0300 can proceed to process block 0330, where the electrical response signal is communicated to the capture module. For example, in some embodiments, the capture module of the respective U-BMS controller (e.g., capture module 0240 of controller 0180) can receive the electrical response signals from one, some, or all of the connected receiving transducers (e.g., transducers 0220-0230).

The method 0300 can proceed to process block 0335, where the response signal can be modified. For example, in some embodiments, the response signal can be modified by amplifying, filtering, digitizing, cleaning, adding a signal ID, adding a time stamp, and/or otherwise structuring the electrical response signal in preparation for analysis. In some embodiments, the response signal can be modified by the capture module (e.g., capture module 0240 of controller 0180) or another module of the U-BMS controller. The method 0300 can proceed to process block 0340, where the modified response signal can be stored. In some embodiments, the modified response signal can be stored locally, for example, in a memory (e.g., memory module 0190) of the respective U-BMS controller. Alternatively or additionally, in some embodiments, the modified response signal can be stored remotely, for example, by transmission over the Internet to a remote processing station.

In some embodiments, method 0300 can relate to every battery module in every stack of the ESS. For example, each U-BMS controller 0180, 0182 (and others, if present) can independently manage ultrasound interrogation sequences. In some embodiments, each U-BMS controller can be operable to sequentially carry out ultrasound interrogation of battery modules (e.g., one at a time). Alternatively or additionally, each U-BMS controller can be operable to carry out a plurality of ultrasound interrogations of battery modules (e.g. by exciting all emitter transducers simultaneously or substantially simultaneously, and receiving all electrical response signals simultaneously or substantially simultaneously).

Figure 3:
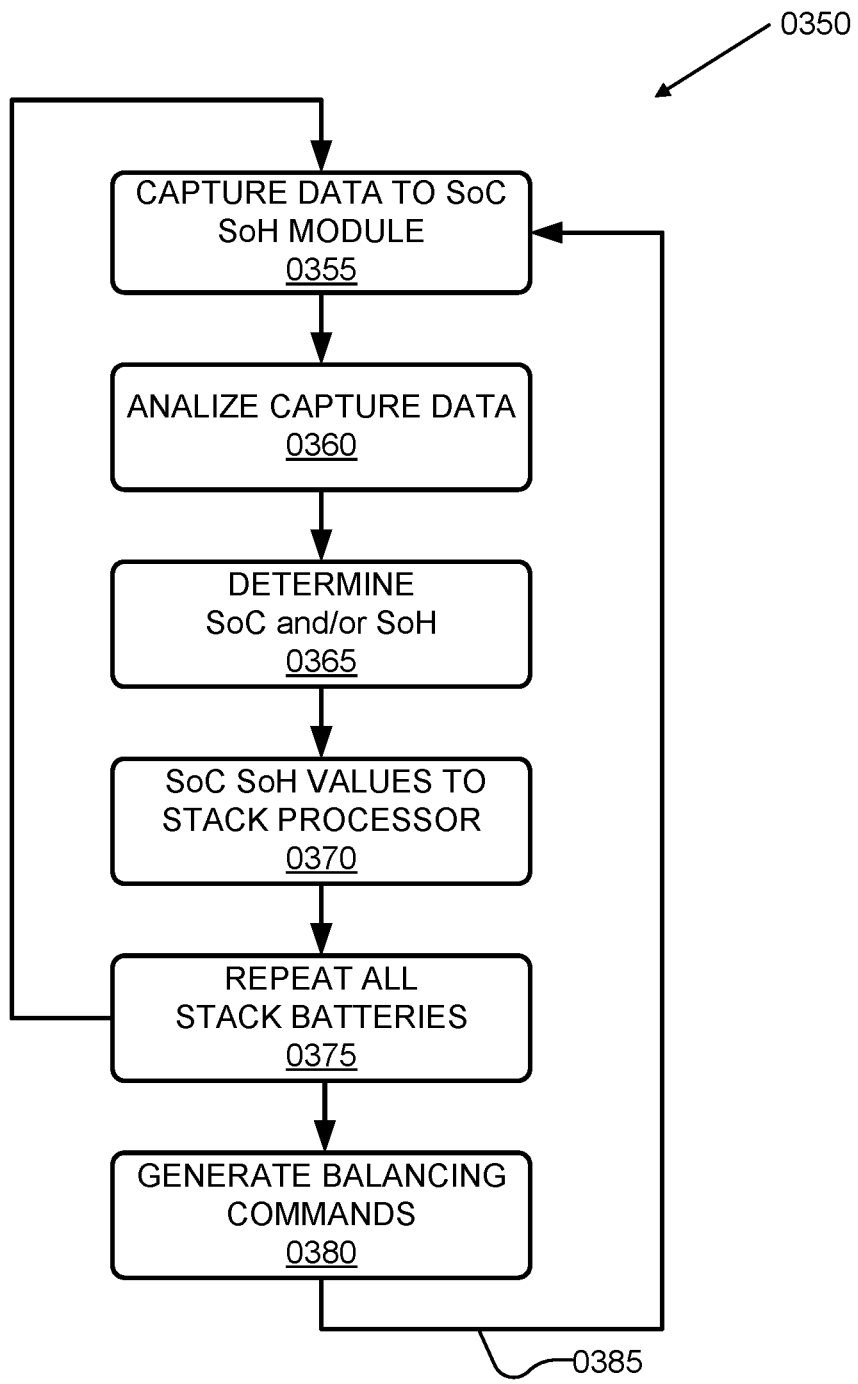
FIG. 3 is a graphical depiction of exemplary functionality for a U-BMS, according to one or more embodiments of the disclosed subject matter.

FIG. 3 illustrates a method 0350 for ultrasound-based management of battery modules of an ESS. In some embodiments, the method 0350 can be based on ultrasound interrogation of battery modules of an ESS, for example, employing the method 0300 in the ESS configuration of FIG. 1. For example, method 0350 can relate to determining SoC and/or SoH state of each battery in a battery stack based on battery capture data instances. In some embodiments, each capture data instance can include an ultrasound response signal received from one transducer pair coupled to one battery module. For example, the capture data instance can be based on a single instance of ultrasound energy passing through the corresponding battery module. Alternatively or additionally, the capture data instance can be based on a plurality of capture data instances of ultrasound energy passing through the corresponding battery module, and the capture data based on those plurality of capture data instances can represent an average, quadratic mean, or similar representation of capture data.

The method 0350 can initiate at process block 0355, where capture data can be sent to an SoC/SoH module. In some embodiments, a first capture data instance corresponding to a first battery stack can be forwarded to an SoC/SoH module (e.g., SoC/SoH module 0250), for example, by the stack processor (e.g., stack processor 0185 of the respective U-BMS controller 0180). The method 0350 can proceed to process block 0360, where the capture data can be analyzed. In some embodiments, the SoC/SoH module (e.g., SoC/SoH module 0250) can analyze the capture data, for example, by using analytical and/or machine learning schema (e.g., machine learning 0255) to characterize the first capture data instance corresponding with the first battery module of the first battery stack.

The method 0350 can proceed to process block 0365, where an SoC value and/or SoH value can be determined. For example, in some embodiments, the SoC/SoH module can determine the SoC value and/or SoH value corresponding with the first battery module. The method 0350 can proceed to process block 0370, where the determined values for SoC and/or SoH can be sent to the stack processor. For example, in some embodiments, the SoC/SoH module can transmit the SoC and/or SoH values to the stack processor of the respective U-BMS controller. The method 0350 can proceed to decision block 0375, where process blocks 0355-0370 can be repeated. For example, in some embodiments, process blocks 0355-0370 can be repeated for the remaining battery modules in the battery stack until SoC and SoH values for each have been submitted to the first stack processor (e.g., processor 0185) of the respective U-BMS controller. The same process can be carried out for other stacks (e.g., second stack 0110) until an SoC value and/or SoH value is assigned for each battery module of each stack of the ESS.

The method 0350 can proceed to process block 0380, where balancing commands can be generated. For example, in some embodiments, the stack processor of the respective U-BMS controller can use the SoC and/or SoH values to generate balancing commands. These balancing commands can configure the SG module (e.g., SG module 0145), for example, to limit current to battery module having a highest SoC value during a charging cycle and/or to limit current drawn from a battery module having a lowest SoC value during a discharging cycle. The method 0350 can return to repeat at 0385, for example, at predetermined time intervals (e.g., intervals in a range of 0.1 minutes to 20 minutes, inclusive).

In some embodiments, method 0350 can relate to every battery module in every stack of the ESS. For example, each U-BMS controller 0180, 0182 (and others, if present) can independently manage capture data analysis to determine SoC and/or SoH values sequentially or simultaneously. In some embodiments, additional SoC/SoH modules can be added (e.g., one module 0250 for each U-BMS controller), and/or parallel processing methods can be employed. In some embodiments, the SoC/SoH module can comprise a cloud-based application operating on a server. Alternatively or additionally, in some embodiments, a local server or a processor of each U-BMS controller (e.g., stack processor 0185 of U-BMS controllers 0180, 0182) can be configured as a SoC/SoH module.

Although some of blocks 0305-0340 of method 0300 and blocks 0355-0385 of method 0350 have been described as being performed once, in some embodiments, multiple repetitions of a particular process block may be employed before proceeding to the next decision block or process block. In addition, although blocks 0305-0340 of method 0300 and blocks 0355-0385 of method 0350 have been separately illustrated and described, in some embodiments, process blocks may be combined and performed together (simultaneously or sequentially). Moreover, although FIG. 2 illustrates a particular order for blocks 0305-0340 and FIG. 3 illustrates a particular order for blocks 0355-0385, embodiments of the disclosed subject matter are not limited thereto. Indeed, in certain embodiments, the blocks may occur in a different order than illustrated or simultaneously with other blocks. For example, even though data capture 0355 is shown occurring prior to generating balancing commands 0380, in some embodiments, process blocks 0355, 0380 can occur simultaneously or overlapping, e.g., when ultrasound interrogation and balancing is performed on a continuous or ongoing basis.

Ultrasound Training Models

In some embodiments, the data used to train the machine learning modules to assign SoC and/or SoH values to each capture data sequence can be derived from charging and/or discharging cycle sequences of a plurality of test battery modules. For example, in some embodiments, a plurality of test battery modules (e.g., of the same or similar battery module type as those of the ESS system) can be evaluated to correlate ultrasound interrogation signals and features of the ultrasound interrogation signals with measured battery module voltage, current, and/or temperature values over a plurality of charging and discharging cycles To create an exemplary SoC and SoH ultrasound signal model, a single battery was characterized by a precision battery cycler while periodic ultrasound response signals were collected and stored. Data associated with the state of the battery was collected over a plurality of charging and discharging cycles, and the plurality of charging and discharging cycles were over a full life of the test batteries. Through development, the timing of all consecutive operations were analyzed and optimized. The ultrasound data was collected using a U-BMS controller interfaced with ultrasound transducers to collect ultrasound response signals at predetermined time intervals. The battery cycler collected battery temperature, voltage, and current signals from the test battery at predetermined time intervals. The ultrasound response signals, and the battery temperature, voltage, and current signals were each time stamped to match which ultrasound signals correspond to which temperature, voltage, and current signals. The battery testing continued over the life of the battery, e.g., at least 300 full charging/discharging profiles between 0% and 100% SoC or at least enough cycle to include a span of SoH degradation. During the testing, ultrasound data was collected by a stack U-BMS controller in 16.1 s average of 100 tests, and SoC and SoH values were determined by an SoC/SoH module in 14.4 s average of 100 tests. Thus, new battery charge balancing data could be provided to the U-BMS controller in segments of just over 30 s. Due to the cycling rate, captures were set for every minute.

Selected merged data was preprocessed, and the ultrasound response signal features were extracted from each ultrasound response signal. Feature matrices for battery modules were run through regressions with both SoC and SoH to determine which features were relevant. These regressions were then trained and tested on the entire ultrasound response dataset to output an ultrasound feature algorithm that maps ultrasound signals to an SoC value and an SoH value for each individual battery. This process was repeated until the ultrasound feature algorithm achieved desired performance. Since only SoC was used for determining balancing, its performance was studied more closely. The root mean squared error (RMSE) and max error in % of SoC is listed in Table 1 below. All RMSEs of batteries are 1% or smaller for the entire range of SoC. However, max error reached 7% for one battery. The ultrasound machine learning modules and ultrasound feature algorithm described can be implemented in an SoC/SoH module (e.g., module 0250 of FIG. 1).

TABLE 1

State of Charge (SoC) Model results

| Battery | RMSE (% of SoC) | Max Error (% of SoC) |
|---|---|---|
| Stack 1 Module 1 | 1% | 2% |
| Stack 1 Module 2 | <1% | 1% |
| Stack 1 Module 3 | <1% | 2% |
| Stack 1 Module 4 | 1% | 2% |
| Stack 1 Module 5 | 1% | 3% |
| Stack 1 Module 6 | <1% | 1% |
| Stack 2 Module 1 | <1% | 1% |
| Stack 2 Module 2 | <1% | 1% |
| Stack 2 Module 3 | 1% | 3% |
| Stack 2 Module 4 | <1% | 2% |
| Stack 2 Module 5 | 1% | 7% |
| Stack 2 Module 6 | <1% | 1% |

TABLE 2

Testing Results

| ID | Timestamp | Voltage (V) | Current (A) | Power (W) | U-BMS SoC | BMS SoH | U-BMS SoH |
|---|---|---|---|---|---|---|---|
| Stack 1 | 2021 Jun. 10 15:33:49 | 41.929 | 0.03 | | 5.33 | 0 | 68.33 |
| NISS01M0 000189 | 2021 Jun. 10 15:33:27 | 7.016 | 0.031 | 0.217 | 6.0 | 0.0 | 69.0 |
| NISS01M0 000182 | 2021 Jun. 10 15:33:31 | 6.946 | 0.027 | 0.188 | 5.0 | 0.0 | 69.0 |
| NISS01M0 000080 | 2021 Jun. 10 15:33:36 | 6.987 | 0.037 | 0.259 | 5.0 | 0.0 | 69.0 |
| NISS01M0 000203 | 2021 Jun. 10 15:33:40 | 6.971 | 0.034 | 0.237 | 5.0 | 0.0 | 67.0 |
| NISS01M0 000345 | 2021 Jun. 10 15:33:44 | 7.018 | 0.033 | 0.232 | 6.0 | 0.0 | 68.0 |
| NISS01M0 000213 | 2021 Jun. 10 15:33:49 | 6.943 | 0.034 | 0.235 | 5.0 | 0.0 | 68.0 |

Battery Stack Charge Balancing

In some embodiments, charge balancing a battery stack during charging and discharging of the entire battery stack can be based, at least in part, on deriving periodic SoC and/or SoH values associated with each stack battery, and the SoC and/or SoH values can be derived from ultrasound interrogation of each stack battery. The charge balancing can be initiated when derived SoC values corresponding with one or more of the stack batteries reaches 15%. Once initiated, the charge balancing can continue until the battery stack is fully charged (e.g., until SoC values reach 100% or nearly 100%). As noted above, conventional battery stack charge balancing based on measured battery voltage was initiated when a battery stack is 80 to 85% charged. In contrast, the battery charge balancing method described herein demonstrates that battery stack charge balancing based on SoC and/or SoH values derived from ultrasound interrogation signals (e.g., via ultrasound machine learning modules and an ultrasound feature algorithm) can be initiated at a battery charge level of 15% and can continue to charge balance the battery stack until the charge level is 100%. Thus, the battery charge balancing method disclosed herein offers the benefit of balancing the battery stack throughout each charge and discharge cycle, including balancing charge levels between the range of 15-80% SoC during normal operation that was otherwise not available with conventional techniques. This increased range of charge balancing can result in increased energy storage as compared to conventional management techniques. Moreover, continuing to charge balance the battery stack during discharging between 100% charged and 15% charged can result in increased energy distribution.

Moreover, the battery charge balancing method disclosed herein highlights charge differences within the ESS, for example, by comparing actual monitored SoC values with theoretical or expected charge levels of stored energy by the stacks. In another experiment, a computer-based stack model was generated to evaluate a battery stack having six Nissan Leaf® battery modules connected in series. The computer-based stack model was set with a fixed internal resistance and SoH value across all six battery modules, and it was assumed that the accuracy of SoC measurement is approximately 1% in accordance with the model results in Table 1. It was assumed that the batteries started out unbalanced with a standard deviation of 5% SoC. The standard deviation of 5% was selected based on observed differences of SoC due to voltage in second-life ESSs. The model demonstrated that through charge balancing in the center range of SoC, the stack capacity was increased over a plurality of battery cycles until it reached its maximum limit. Specifically, it was found that in 3 cycles the stack capacity of the single stack was increased by approximately 13%.

Figure 4:
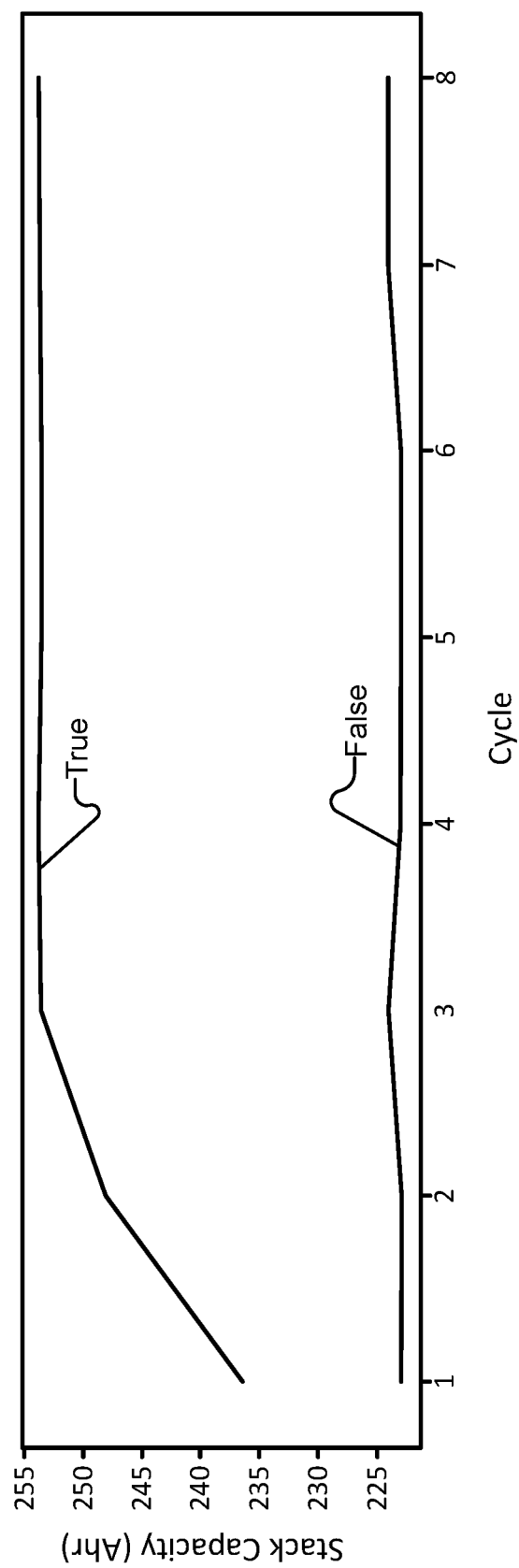
FIG. 4 is a graph of battery module stack energy storage capacity versus number of charging and discharging cycles illustrating the balancing effect on increased stack capacity by cycle number.

FIG. 4 is a graphical plot showing stack capacity in Amp-hours (A-hr) versus number of charge and discharge cycles. FIG. 4 was based on the computer-based stack model generated to evaluate a battery stack having six Nissan Leaf battery modules connected in series. The first curve labeled "False" represents a stack at a charge capacity of 100% and that does not apply charge balancing. As shown in FIG. 4, the first curve has a nearly constant capacity value over the eight charging and discharging cycles, with an average maximum charge capacity less than 225 A-hr. The second curve labeled "True" represents a stack at a charge capacity of 100% and that does apply charge balancing. As shown in FIG. 4, the second curve shows a marked increase in charge capacity over the first three charge and discharging cycles and then a constant charge capacity of about 254 A-hr for each subsequent charge and discharge cycle.

In some embodiments, a method for battery charge balancing during a charging cycle can include, during a charge cycle, if a battery's ultrasound-derived SoC value is greater than a minimum SoC value of other stack batteries by more than 1%, the U-BMS controller can instruct the BMS control panel to limit current through the battery having the higher SoC. In some embodiments, the current can be limited, for example, by a switch to discontinue current flow and/or by a current attenuator operable to incrementally decrease current amplitude to the battery having the higher SoC. In some embodiments, the method for battery charge balancing can further include, based on subsequent ultrasound-derived SoC values of the battery having the higher SoC, if the derived SoC value is not greater than the minimum SoC value of other stack batteries by more than 1%, the U-BMS controller can instruct the BMS control panel to either open a switch and allow current to flow unrestricted through the battery or to incrementally increase current amplitude to the battery by the current attenuator. In some embodiments, the method for battery charge balancing can further include, if more than one ultrasound derived SoC value is greater than the minimum SoC value of other stack batteries by more than 1%, the U-BMS controller can instruct the BMS control panel to limit current through other batteries having the higher SoC. In some embodiments, the current can be limited, for example, by a switch to discontinue current flow and/or by a current attenuator operable to incrementally decrease current amplitude to the other batteries having the higher SoC.

In some embodiments, a method for battery charge balancing during a discharging cycle can include, during a discharge cycle, if an ultrasound-derived SoC value is lower than the minimum SoC of the other stack by more than 1%, the U-BMS controller can instruct the BMS control panel to limit current drawn from the battery having the lower SoC. In some embodiments, the current draw can be limited, for example, by a switch to discontinue current flow and/or by a current attenuator operable to incrementally decrease current amplitude from the battery having the lower SoC. In some embodiments, the method for battery charge balancing during the discharging cycle can further include, based on subsequent ultrasound derived SoC values of the battery having the higher SoC, if the derived SoC value is within the 1% difference in SoC values, current can be limited only for batteries with SoC differences higher than 1%.

Exemplary Use

Under conventional systems, it is generally faster and cheaper to retire or recycle electric vehicle batteries removed from electric vehicles, rather than repurpose them after their "first life" application. However, in many cases these batteries can be used for stationary storage, functioning, for example, as backup systems for homes, data centers, hospitals, and schools. Embodiments of the disclosed subject matter provide the ability of an ultrasound BMS technology to, by virtue of more precise measures of SoC and/or SoH, improve the energy storage functionality (e.g., of residential solar arrays) by economically identifying and selecting modules with similar SoH, by enabling more precise BMS control of battery charging and discharging, and by balancing battery stacks of different SoH in the same system. This can allow residential and industrial users to store more energy and to recapture more energy from their systems, while further reducing the system cost by using second life batteries.

In some embodiments, the ultrasonic technology described herein can replace an expensive and therefore seldom used 8-hour to 20-hour process requiring a battery cycler to determine battery SoH with an easy, shorter-duration diagnostic test. For example, this ultrasound-based diagnostic test can be completed in a range of 10 seconds to about 45 minutes, depending on battery and test equipment configuration. This can enable users to economically procure batteries modules with substantially similar SoH. More accurate values of SoC and SoH can also enable batteries to be charged and discharged safely to their fullest extent. Current BMS systems do not permit this functionality, as they unnecessarily restrict the ranges of charge and discharge due to uncertainties in SoC. Real-time knowledge of SoH can also enable optimal simultaneous discharge of groups of modules with different SoCs and/or SoHs. Moreover, in conventional systems, discharge is halted when the weakest stack has reached its BMS-determined lower limit. In contrast, the more effective stack "dynamic balancing" offered by the disclosed techniques can slow discharge or charge from lower SoC stacks relative to others, so that discharge or charge will continue until the total energy available is released captured. In addition, this dynamic balancing can support addition of more capacity over time.

While the foregoing examples and embodiments have been described with respect to ultrasonic transducers coupled to Nissan Leaf® 2nd life EV batteries, the associated electronics for ultrasound wave generation inside the batteries and for signal acquisition and analysis to determine SoC during charging and discharging cycles is applicable to any new or used battery systems that can be interrogated by ultrasound waves, including but not limited to batteries manufactured by BMW, Hyundai, Mercedes-Benz, etc. In some embodiments, a universal enclosure can be provided to accommodate batteries of different electric vehicle manufacturers in addition to management components of the disclosed U-ESS.

Measurement Accuracy

Conventional battery management systems can only measure SoC to within 10%. Indeed, conventional applications often involve simply reading SoH from a table. Consequently, the range of charge over which a BMS will allow a battery to safely charge or discharge is unnecessarily restricted to account for these uncertainties. With more accurate measures of SoC and SoH as described herein, a battery can be operated closer to its true safety limits, unlocking its full chemical capacity and providing, for example, greater electric vehicle ranges, longer cell phone operation, etc. Battery useful lifetimes may also be increased (e.g., 2×) when secondary use batteries become usable in ESS because of improvements in balancing battery storage systems as described herein.

TABLE 3

Testing Methodology

| Item | Requirement Description | Test Method | Acceptance Criteria |
|---|---|---|---|
| 1 | Stack Battery Architecture and Connectivity | Visual | Stack (6 modules) is connected in series. Top and bottom of stack are connected to stack switchgear. |
| 2 | Stack Voltage | Voltmeter | Connected stack in series measured at the stack switchgear should have voltage 36 V-50 V. |
| 3 | Stack Capacity | Cycling at C/4 rate | Stack capacity is ~1.5 kWh for discharge. Stack capacity is based on energy calculation (based on 6 modules in series and approximate SoH). This number is doubled for a full system. |
| 4 | Stack Ultrasound Captures Acquired | Visual | Confirm ultrasound captures are taken every minute during cycling. Confirmed using report generated by Titan EchOES during cycling. |
| 5 | Stack EchOES BMS Data Acquired | Visual | Confirm BMS data (voltage, current) is collected every minute during cycling for SoC model. |
| 6 | Stack SoC/SoH Produced | Cycling | Confirm SoC/SoH measurements for modules in stack produced each minute during cycling. |
| 7 | Stack Augmentation via Balancing | Cycling | Confirm Titan is balancing. |

Computer Implementation

Figure 5:
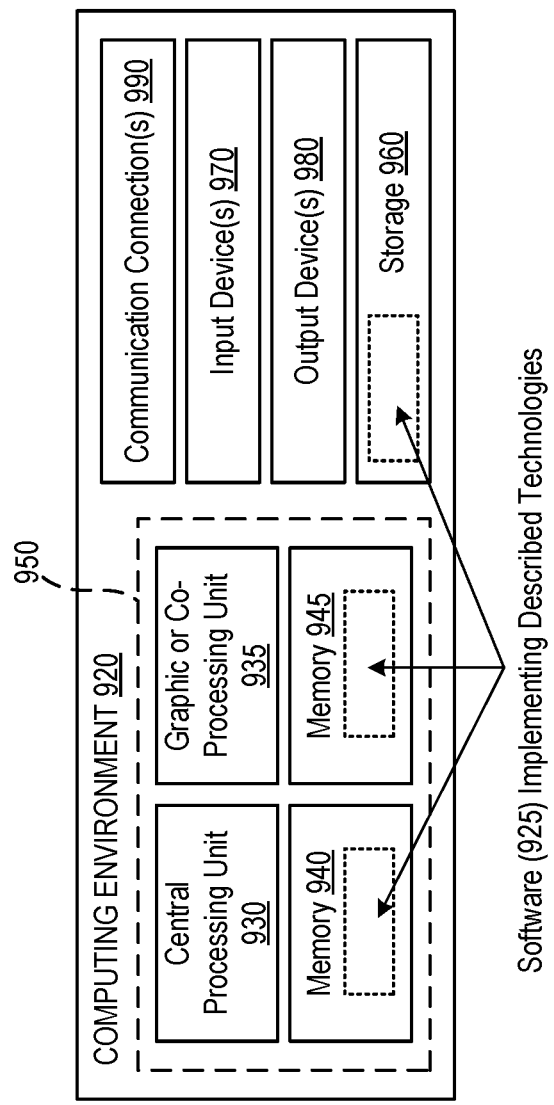
FIG. 5 depicts a generalized example of a computing environment in which the disclosed technologies may be implemented.

FIG. 5 depicts a generalized example of a suitable computing environment 920 in which the described innovations may be implemented, such as aspects of the U-BMS architecture described above, the EchOES device, the battery control panel, the coordinator, etc. The computing environment 920 is not intended to suggest any limitation as to scope of use or functionality, as the innovations may be implemented in diverse general-purpose or special-purpose computing systems. For example, the computing environment 920 can be any of a variety of computing devices (e.g., desktop computer, laptop computer, server computer, tablet computer, etc.). In some embodiments, the computing environment is an integral part of a battery management system. Alternatively, in some embodiments, the computing environment is a separate system connected to the battery management system, for example, by making operative electrical connections (e.g., wired or wireless) to the battery management system or components thereof.

With reference to FIG. 5, the computing environment 920 includes one or more processing units 930, 935 and memory 940, 945. In FIG. 5, this basic configuration 950 is included within a dashed line. The processing units 930, 935 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5 shows a central processing unit 930 as well as a graphics processing unit or co-processing unit 935. The tangible memory 940, 945 may be volatile memory (e.g., registers, cache, RAM), non-volatile memory (e.g., ROM, EEPROM, flash memory, etc.), or some combination of the two, accessible by the processing unit(s). The memory 940, 945 stores software 925 implementing one or more innovations described herein, in the form of computer-executable instructions suitable for execution by the processing unit(s).

A computing system may have additional features. For example, the computing environment 920 includes storage 960, one or more input devices 970, one or more output devices 980, and one or more communication connections 990. An interconnection mechanism (not shown) such as a bus, controller, or network interconnects the components of the computing environment 920. Typically, operating system software (not shown) provides an operating environment for other software executing in the computing environment 920, and coordinates activities of the components of the computing environment 920.

The tangible storage 960 may be removable or non-removable, and includes magnetic disks, magnetic tapes or cassettes, CD-ROMs, DVDs, or any other medium which can be used to store information in a non-transitory way, and which can be accessed within the computing environment 920. The storage 960 can store instructions for the software 925 implementing one or more innovations described herein.

The input device(s) 970 may be a touch input device such as a keyboard, mouse, pen, or trackball, a voice input device, a scanning device, or another device that provides input to the computing environment 920. The output device(s) 970 may be a display, printer, speaker, CD-writer, or another device that provides output from computing environment 920.

The communication connection(s) 990 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or other carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, the disclosed technology is not limited to any specific computer language or program. For instance, aspects of the disclosed technology can be implemented by software written in C++, Java, Perl, any other suitable programming language. Likewise, the disclosed technology is not limited to any computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above-described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

ADDITIONAL EXAMPLES OF THE DISCLOSED TECHNOLOGY

In view of the above-described implementations of the disclosed subject matter, this application discloses the additional examples in the clauses enumerated below. It should be noted that one feature of a clause in isolation, or more than one feature of the clause taken in combination, and, optionally, in combination with one or more features of one or more further clauses are further examples also falling within the disclosure of this application.

Clause 1. An energy storage system comprising:
   a stack of multiple battery modules;
   a plurality of ultrasound emitter transducers, each ultrasound emitter transducer acoustically coupled to a surface of a respective one of the battery modules;
   a plurality of ultrasound receiving transducers, each ultrasound receiving transducer acoustically coupled to a surface of a respective one of the battery modules;
   one or more excitation modules electrically interfaced with the plurality of ultrasound emitter transducers;
   one or more capture modules electrically interface with the plurality of ultrasound receiving transducers; and
   an ultrasound battery management system controller configured to initiate battery module ultrasound interrogation sequences.

Clause 2. The energy storage system of any clause or example herein, in particular, Clause 1, wherein the stack of multiple battery modules is connected in series with a power exchange module, and the stack of multiple battery modules is configured to be charged or discharged during the ultrasound interrogation sequences.

Clause 3. The energy storage system of any clause or example herein, in particular, any one of Clauses 1-2, wherein an ultrasound emitter transducer and an ultrasound receiving transducer are acoustically coupled to at least one battery module for through-transmission mode.

Clause 4. The energy storage system of any clause or example herein, in particular, any one of Clauses 1-3, wherein an ultrasound emitter transducer and an ultrasound receiving transducer are acoustically coupled to at least one battery module for echo-transmission mode.

Clause 5. The energy storage system any clause or example herein, in particular, any one of Clauses 1-4, wherein the stack of multiple battery modules are connected in series with a power exchange module.

Clause 6. The energy storage system any clause or example herein, in particular, Clause 5, further comprising:
   a switching gear module disposed between the power exchange module and the stack of multiple battery modules,
   wherein the switching gear module is configured to manage battery charge balancing during charging and discharging of the stack.

Clause 7. The energy storage system of any clause or example herein, in particular, Clause 6, wherein the ultrasound battery management system controller is configured to:
   generate charge balancing commands based on the state of charge of each battery module of the stack; and
   forward the charge balancing commands to the switching gear module.

Clause 8. The energy storage system of any clause or example herein, in particular, any one of Clauses 6-7, wherein the ultrasound battery management system controller is configured to:
   generate charge balancing commands based on the state of charge and the state of health of each battery module of the stack; and
   forward the charge balancing commands to the switching gear module.

Clause 9. The energy storage system of any clause or example herein, in particular, any one of Clauses 6-8, wherein at least a portion of the stack battery modules has a state of health value of 80% or less.

Clause 10. The energy storage system of any clause or example herein, in particular, any one of Clauses 6-9, wherein the charge balancing is managed over a state of charge value range of 15% to 100%, inclusive, during stack charging cycles and over a state of charge value range of 100% to 15%, inclusive, during stack discharging cycles.

Clause 11. The energy storage system of any clause or example herein, in particular, any one of Clauses 1-10, wherein the capture module generates capture data corresponding to each battery module.

Clause 12. The energy storage system of any clause or example herein, in particular, Clause 11, wherein the capture data corresponding to each battery module is processed by an SoC/SoH module to associate a state of charge (SOC) value with each battery module.

Clause 13. The energy storage system of any clause or example herein, in particular, any one of Clauses 11-12, wherein the capture data corresponding to each battery module is processed by an SoC/SoH module to associate a state of health (SOH) value with each battery module.

Clause 14. The energy storage system of any clause or example herein, in particular, any one of Clauses 11-13, wherein the capture data corresponding with each battery module is processed by an SoC/SoH module to associate a state of charge (SoC) value and a state of health (SoH) value with each battery module.

Clause 15. A method comprising:
 acoustically coupling ultrasound emitter transducers and ultrasound receiving transducers to battery modules of a stack of multiple battery modules;
 electrically interfacing each ultrasound emitter transducer with one or more excitation modules;
 electrically interfacing each ultrasound receiving transducer with one or more capture modules; and
 initiating battery ultrasound interrogation sequences by an ultrasound battery management system controller.

Clause 16. The method of any clause or example herein, in particular, Clause 15, further comprising:
 connecting the stack in series with a power exchange module; and
 charging or discharged the stack during the ultrasound interrogation sequences.

Clause 17. The method of any clause or example herein, in particular, any one of Clauses 15-16, wherein at least one pair of the ultrasound emitter transducers and ultrasound receiving transducers are coupled to one of the battery modules in a through-transmission mode configuration.

Clause 18. The method of any clause or example herein, in particular, any one of Clauses 15-17, wherein at least one pair of the ultrasound emitter transducers and ultrasound receiving transducers are coupled to one of the battery modules in an echo-transmission mode configuration.

Clause 19. The method of any clause or example herein, in particular, any one of Clauses 15-18, wherein the ultrasound interrogation sequence includes generating capture data corresponding with each battery module of the stack by the one or more capture modules.

Clause 20. The method of any clause or example herein, in particular, Clause 19, further comprising processing the generated capture data by an SoC/SoH module to associate a state of charge value with each battery module of the stack.

Clause 21. The method of any clause or example herein, in particular, any one of Clauses 19-20, further comprising processing the generated capture data by an SoC/SoH module to associate a state of health value with each battery module of the stack.

Clause 22. The method of any clause or example herein, in particular, any one of Clauses 19-21, further comprising processing the generated capture data by an SoC/SoH module to associate a state of charge value and a state of health value with each battery module of the stack.

Clause 23. The method of any clause or example herein, in particular, any one of Clauses 15-22, further comprising disposing a switching module between the stack and a power exchange module.

Clause 24. The method of any clause or example herein, in particular, Clause 23, further comprising:
 generating, by the ultrasound battery management system controller, charge balancing commands based on a state of charge value associated with each battery module of the stack.

Clause 25. The method of any clause or example herein, in particular, Clause 24, wherein:
 the charge balancing of the stack is performed over a state of charge value range of 15% to 100% during stack charging cycles; or
 the charge balancing of the stack is performed over a state of charge value range of 100% to 15% during stack discharging cycles.

Clause 26. A method for operating an energy storage system (ESS) to charge balance a stack of battery modules, the method comprising:
 (a) configuring the stack for ultrasound interrogation of each battery module;
 (b) capturing ultrasound signal data corresponding with ultrasound energy passing through each battery module;
 (c) processing the ultrasound signal data by an SoC/SoH module and assigning a state of charge value to each battery module;
 (d) generating charge balancing commands based on the state of charge value associated with each battery module; and
 (e) charge balancing the stack over an assigned state of charge value range of 15% to 100% during stack charging cycles, and/or charge balancing the stack over an assigned state of charge value range of 100% to 15% during stack discharging cycles.

Clause 27. The method of any clause or example herein, in particular, Clause 26, further comprising:
 (f) repeating (a) through (e).

Clause 28. A method for charge balancing in an energy storage system comprising a stack of multiple battery modules, the method comprising:
 (a) during a charge cycle of the stack:
  measuring state of charge (SoC) for each battery module in the stack;
  in response to the measured (SoC) for a first module of the battery modules being higher than a first threshold value by more than 1%, generating one or more control signals that cause current through the first module to be limited;
  re-measuring (SoC) for each battery module in the stack; and
  in response to the re-measured (SoC) for the first module of the battery modules being within 1% of the first threshold value, generating one or more control signals that cause the limit on the current through the first module to be removed.

Clause 29. A method for charge balancing in an energy storage system comprising a stack of multiple battery modules, the method comprising:
 (b) during a discharge cycle of the stack:
  measuring state of charge (SoC) for each battery module in the stack;
  in response to the measured SoC for a first module of the battery modules being less than a second threshold value by more than 1%, generating one or more control signals that cause current drawn from the first module to be limited;
  re-measuring SoC for each battery module in the stack; and in response to the re-measured SoC for the first module of the battery modules being within 1% of a second threshold value, generating one or more control signals that cause the limit on the current drawn from the first module to be removed.

Clause 30. The method of any clause or example herein, in particular, any one of Clauses 28-29, wherein the first threshold value, the second threshold value, or both comprises a minimum value of the determined SoCs for the rest of the battery modules in the stack.

Clause 31. The method of any clause or example herein, in particular, any one of Clauses 28-30, wherein the current through the first module, the current drawn from the first module, or both are limited by a switch that discontinues current flow or by a current attenuator operable to incrementally decrease current amplitude to the first module.

Clause 32. The method of any clause or example herein, in particular, any one of Clauses 28-31, wherein during the charge and/or discharge cycles, the SoC for one, some, or all of the battery modules is at least 15%.

Clause 33. The method of any clause or example herein, in particular, any one of Clauses 28-32, wherein during the charge and/or discharge cycles, the SoC for one, some, or all of the battery modules is in a range of 15-80%, inclusive.

Clause 34. The method of any clause or example herein, in particular, any one of Clauses 28-33, wherein during the charge and/or discharge cycles, the SoC for one, some, or all of the battery modules is at least 80%.

Clause 35. The method of any clause or example herein, in particular, any one of Clauses 28-34, wherein the measuring SoC and/or re-measuring SoC comprise:
  interrogating the battery modules with ultrasound to generate one or more ultrasound signals; and
  based at least in part on the one or more ultrasound signals, determining SoC for each battery module.

Clause 36. An ultrasound-based battery management system (U-BMS) comprising
  one or more processors;
  computer readable storage media storing computer-readable instructions that, when executed by the one or more processors, cause the one or more processors to perform the method of any clause or example herein, in particular, any one of Clauses 15-35.

Clause 37. An energy storage system comprising:
  a stack of multiple battery modules; and
  the ultrasound-based battery management system of Clause 36.

Clause 38. The energy storage system of any clause or example herein, in particular, any one of Clauses 37, wherein each battery module comprises a secondary-use lithium-ion battery module.

CONCLUSION

Although batteries, components, and configuration have been illustrated in the figures and discussed in detail herein, embodiments of the disclosed subject matter are not limited thereto. Indeed, one of ordinary skill in the art will readily appreciate that different batteries, components, or configurations can be selected and/or components added to provide the same effect. In practical implementations, embodiments may include additional components or other variations beyond those illustrated. Accordingly, embodiments of the disclosed subject matter are not limited to the particular batteries, components, and configurations specifically illustrated and described herein.

Any of the features illustrated or described herein, for example, with respect to FIGS. 1-5 and Clauses 1-38, can be combined with any other feature illustrated or described herein, for example, with respect to FIGS. 1-5 and Clauses 1-38 to provide systems, devices, methods, and embodiments not otherwise illustrated or specifically described herein. All features described herein are independent of one another and, except where structurally impossible, can be used in combination with any other feature described herein.

In view of the many possible embodiments to which the principles of the disclosed technology may be applied, it should be recognized that the illustrated embodiments are only examples and should not be taken as limiting the scope of the disclosed technology. Rather, the scope is defined by the following claims. We therefore claim all that comes within the scope and spirit of these claims.

The invention claimed is:

1. An energy storage system comprising:
  a stack of battery modules;
  a plurality of ultrasound emitter transducers, each ultrasound emitter transducer acoustically coupled to a surface of a respective one of the battery modules;
  a plurality of ultrasound receiving transducers, each ultrasound receiving transducer acoustically coupled to a surface of a respective one of the battery modules;
  one or more excitation modules electrically interfaced with the plurality of ultrasound emitter transducers;
  one or more capture modules electrically interfaced with the plurality of ultrasound receiving transducers; and
  an ultrasound battery management system controller configured to initiate battery module ultrasound interrogation sequences,
  wherein the stack of battery modules is connected in series with a power exchange module, and the stack of battery modules is configured to be charged or discharged during the ultrasound interrogation sequences.

2. The energy storage system of claim 1, wherein an ultrasound emitter transducer and an ultrasound receiving transducer are acoustically coupled to at least one battery module for through-transmission mode.

3. The energy storage system of claim 1, wherein an ultrasound emitter transducer and an ultrasound receiving transducer are acoustically coupled to at least one battery module for echo-transmission mode.

4. The energy storage system of claim 1, wherein the one or more capture modules generate capture data corresponding to each battery module, and the capture data corresponding to each battery module is processed by an SoC/SoH module to associate a state of charge (SOC) value, state of health (SOH) value, or both SOC and SOH values with each battery module.

5. An energy storage system comprising:
  a stack of battery modules;
  a plurality of ultrasound emitter transducers, each ultrasound emitter transducer acoustically coupled to a surface of a respective one of the battery modules;
  a plurality of ultrasound receiving transducers, each ultrasound receiving transducer acoustically coupled to a surface of a respective one of the battery modules;
  one or more excitation modules electrically interfaced with the plurality of ultrasound emitter transducers;
  one or more capture modules electrically interfaced with the plurality of ultrasound receiving transducers; and
  an ultrasound battery management system controller configured to initiate battery module ultrasound interrogation sequences,
  wherein:

the stack of battery modules are connected in series with a power exchange module;

the energy storage system further comprises a switching gear module disposed between the power exchange module and the stack of battery modules; and the switching gear module is configured to manage battery charge balancing during charging and discharging of the stack of battery modules.

6. The energy storage system of claim 5, wherein the ultrasound battery management system controller is configured to:

generate charge balancing commands based on a state of charge (SOC), a state of health (SOH), or both SOC and SOH of each battery module of the stack of battery modules; and forward the charge balancing commands to the switching gear module.

7. The energy storage system of claim 5, wherein at least a portion of the stack of battery modules has a state of health value of 80% or less.

8. The energy storage system of claim 5, wherein the charge balancing is managed over a state of charge value range of 15% to 100%, inclusive, during stack charging cycles and over a state of charge value range of 100% to 15%, inclusive, during stack discharging cycles.

9. A method comprising:

acoustically coupling ultrasound emitter transducers and ultrasound receiving transducers to battery modules of a stack of battery modules;

electrically interfacing each ultrasound emitter transducer with one or more excitation modules;

electrically interfacing each ultrasound receiving transducer with one or more capture modules;

initiating battery ultrasound interrogation sequences by an ultrasound battery management system controller;

connecting the stack of battery modules in series with a power exchange module; and charging or discharging the stack of battery modules during the battery ultrasound interrogation sequences.

10. The method of claim 9, wherein at least one pair of the ultrasound emitter transducers and ultrasound receiving transducers are coupled to one of the battery modules in a through-transmission mode configuration.

11. The method of claim 9, wherein at least one pair of the ultrasound emitter transducers and ultrasound receiving transducers are coupled to one of the battery modules in an echo-transmission mode configuration.

12. The method of claim 9, wherein the initiating battery ultrasound interrogation sequences includes generating capture data corresponding with each battery module of the stack of battery modules by the one or more capture modules.

13. The method of claim 12, further comprising processing the generated capture data by an SoC/SoH module to associate a state of charge value with each battery module of the stack of battery modules.

14. The method of claim 12, further comprising processing the generated capture data by an SoC/SoH module to associate a state of health value with each battery module of the stack of battery modules.

15. The method of claim 12, further comprising processing the generated capture data by an SoC/SoH module to associate a state of charge value and a state of health value with each battery module of the stack of battery modules.

16. A method comprising:

acoustically coupling ultrasound emitter transducers and ultrasound receiving transducers to battery modules of a stack of battery modules;

electrically interfacing each ultrasound emitter transducer with one or more excitation modules;

electrically interfacing each ultrasound receiving transducer with one or more capture modules;

initiating battery ultrasound interrogation sequences by an ultrasound battery management system controller; and disposing a switching module between the stack of battery modules and a power exchange module.

17. The method of claim 16, further comprising:

generating, by the ultrasound battery management system controller, charge balancing commands based on a state of charge value associated with each battery module of the stack of battery modules.

18. The method of claim 17, wherein:

the charge balancing of the stack of battery modules is performed over a state of charge value range of 15% to 100% during stack charging cycles; or the charge balancing of the stack of battery modules is performed over a state of charge value range of 100% to 15% during stack discharging cycles.

* * * * *